Nov. 22, 1955    C. W. McMATH    2,724,148
SEED DELINTER
Filed May 23, 1951    3 Sheets-Sheet 1
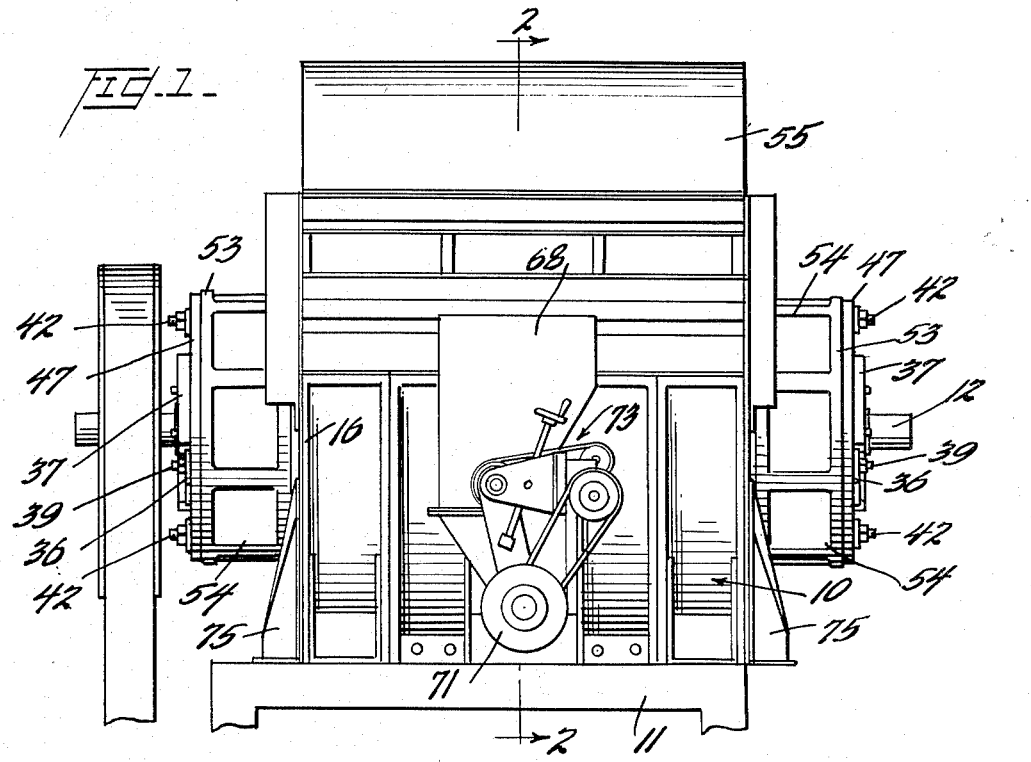
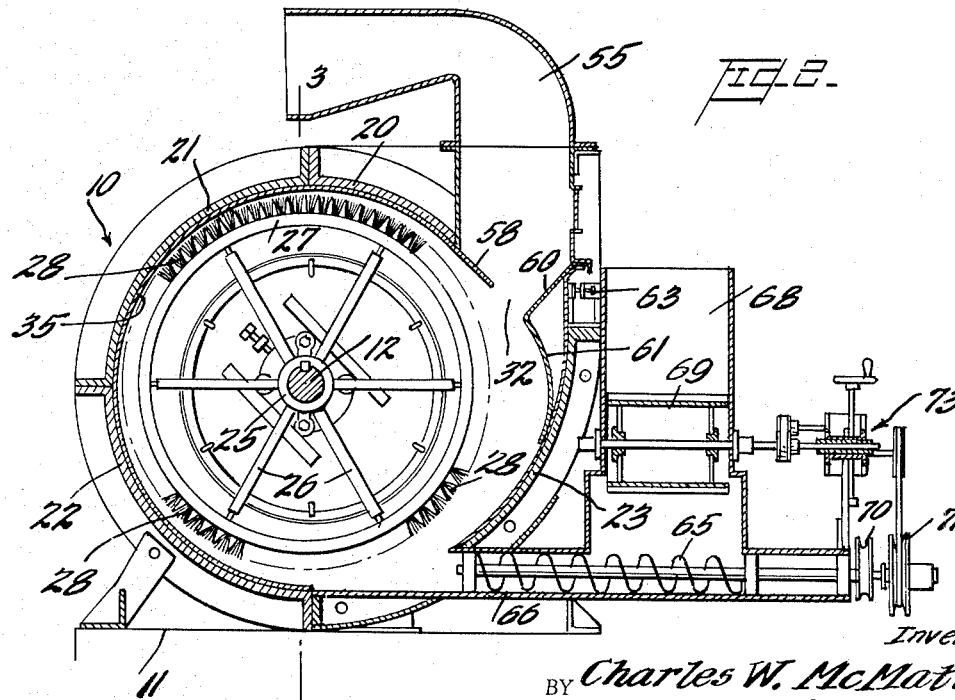
Inventor
BY Charles W. McMath,
Watson, Cole, Grindle & Watson
ATTORNEYS Nov. 22, 1955
C. W. McMATH
2,724,148
SEED DELINTER
Filed May 23, 1951
3 Sheets-Sheet 2
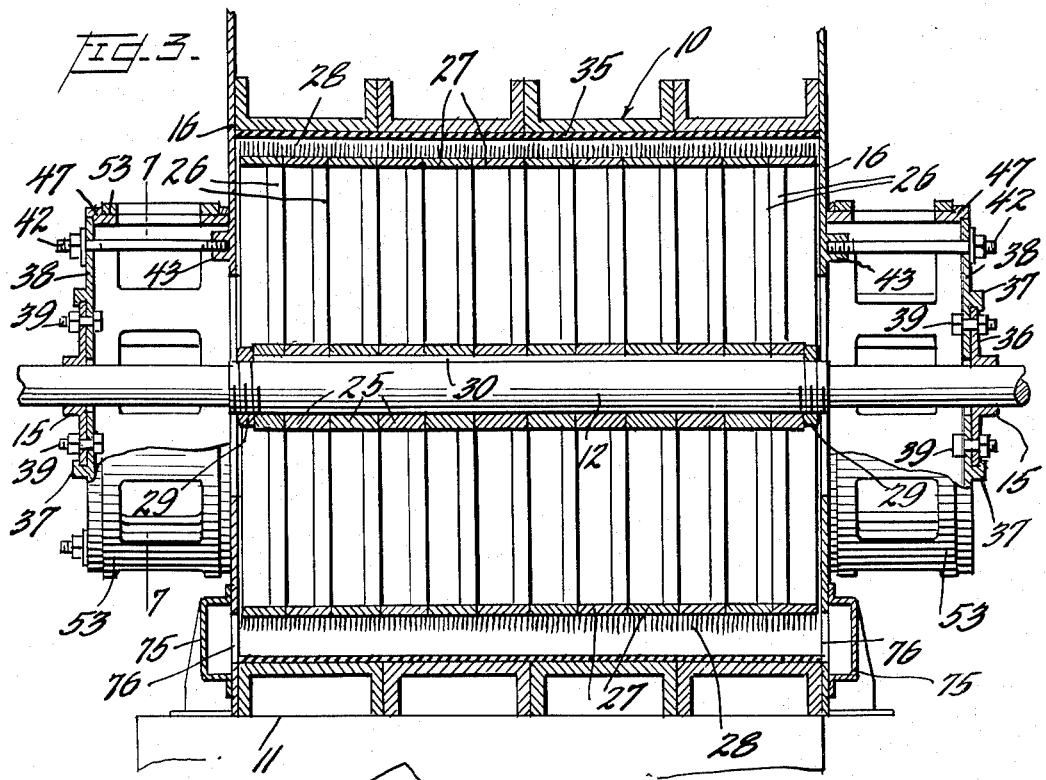
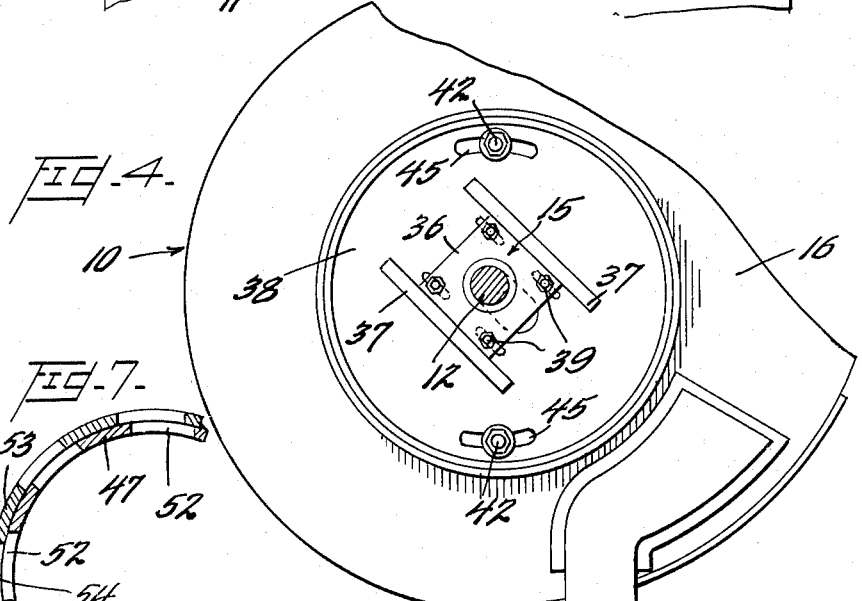
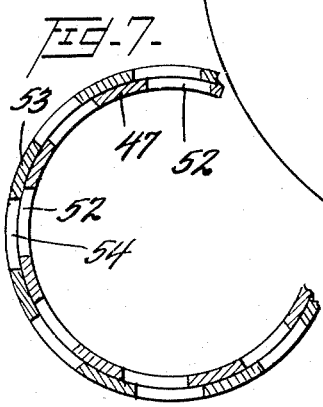
INVENTOR
Charles W. McMath,
BY Watson, Cole, Grindle & Watson
ATTORNEYS Nov. 22, 1955
C. W. McMATH
2,724,148
SEED DELINTER
Filed May 23, 1951
3 Sheets-Sheet 3
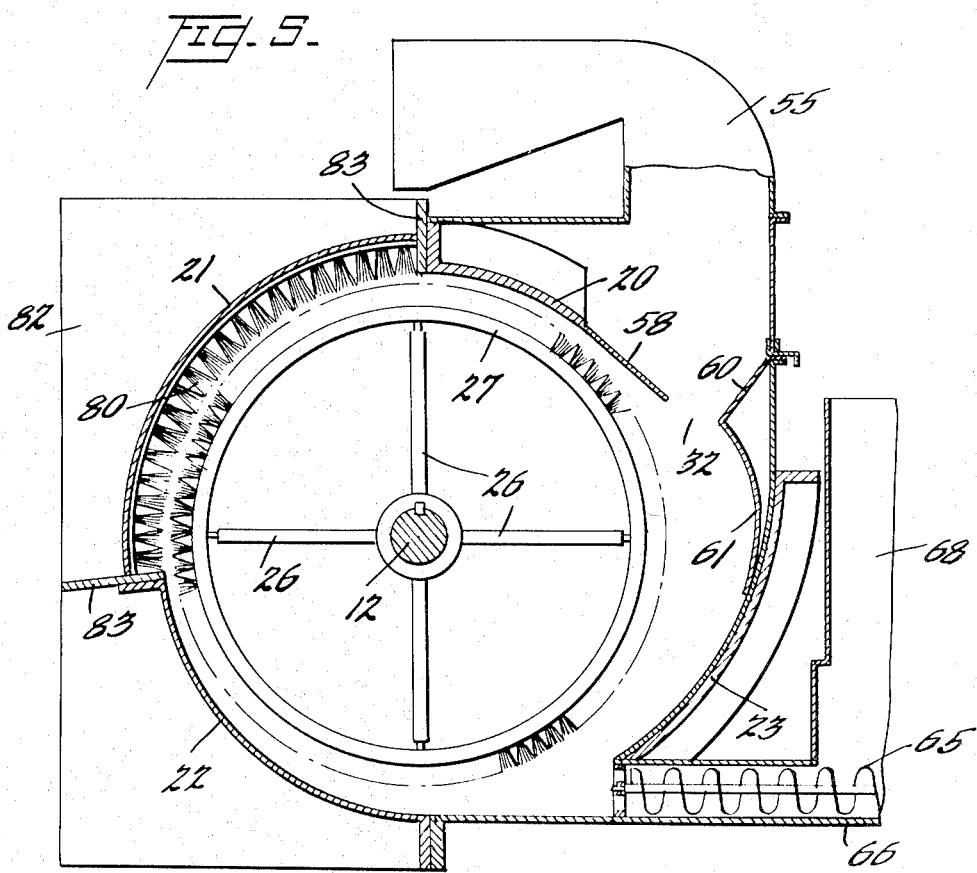
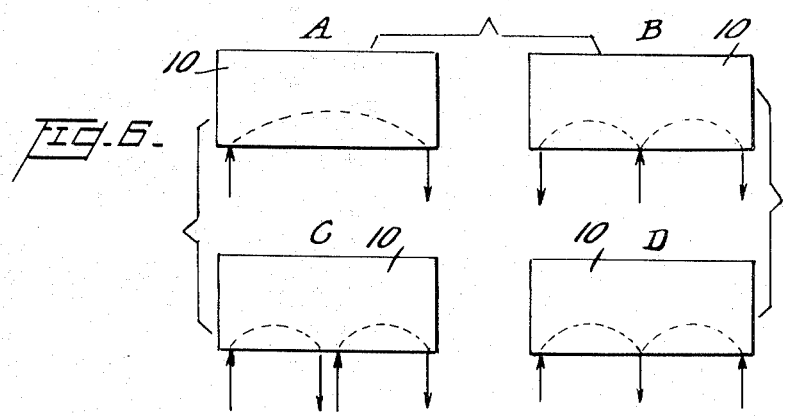
INVENTOR
*Charles W. McMath,*
BY *Watson, Cole, Grindle & Watson*
ATTORNEYS United States Patent Office 2,724,148
Patented Nov. 22, 1955

2,724,148

SEED DELINTER

Charles W. McMath, Fort Worth, Tex., assignor, by mesne assignments, to The Buckeye Cotton Oil Company, Cincinnati, Ohio, a corporation of Ohio Application May 23, 1951, Serial No. 227,900

14 Claims. (Cl. 19—44)

This invention relates to improvements in machines for delinting cottonseed, and particularly to improvements in the rotating brush type of delinter.

The brush type of ginning and delinting machines heretofore constructed have had many shortcomings; typical of these are inefficient delinting performance, contaminated lint, excessive breakage of seed, incomplete separation of lint from delinted seed, tendency to clog, high power requirements, low seed throughput capacity, and mechanical defects and complexities.

The saw type of delinter is even less desirable in some respects, for it causes chipping and scaling of small particles of the outer pigment layer of the seedcoat and therefore gives a lint unduly contaminated with "hull pepper"; also, the cost of saw sharpening is high.

In the practice of the present invention, provision is made for repeated contact between linty cottonseed and the tips of the bristles of a rapidly rotating brush within a confining casing. Individual lint fibers are dislodged from the seedcoat whenever a bristle tip collides with a seed at or near a fiber root. This is accomplished by causing the seed to pass through a delinting zone defined on the inner side by the brush bristles, which are traveling in a circular path at a high peripheral speed, and on the outer side by a yieldable friction lining on the internal wall of the casing, which confines the rapidly moving seed within the delinting zone without breakage and causes repeated contact of each seed with the moving bristle tips.

It is an object of this invention to provide a brush type cottonseed delinter which will more completely separate the lint from the seed and foreign material, and produce cleaner lint than has been heretofore possible with similar types of delinters.

Another object is to provide a delinting machine having a much lower power requirement for a given amount of seed delinting than has heretofore been possible.

An important feature of my machine is the mounting of the delinting brush eccentrically within the delinter casing, and the bearings for the brush are preferably adjustable radially and circumferentially of the casing. Thus I provide a zone of least clearance between the brush and the casing, which may be varied in radial depth and displaced circumferentially, in which the work done on the seed through coaction between the rotating brush and the casing lining is most vigorous, and a zone in which there is substantial clearance between the brush and the casing, usually many times the least clearance, wherein separation of dislodged lint fibers and seed is promoted, the lint fibers being removed from the last named zone by a current of air.

A further feature is the provision of a casing having an unobstructed lint discharge opening, preferably extending over substantially the entire length of the casing, thereby minimizing clogging. Still another feature is the provision of means for controlling air flow in the vicinity of the lint discharge opening to regulate the withdrawal of lint fibers and ensure efficient separation of dislodged lint from the seed material and trash.

Further objects and features of the invention will be apparent from the following description taken in connection with the accompanying drawings, in which:

Figure 1 is a side elevation of a delinting machine embodying the principles of the invention;

Figure 2 is a transverse vertical section taken substantially on line 2—2 of Figure 1;

Figure 3 is a longitudinal vertical section on the line 3—3 of Figure 2;

Figure 4 is a partial end view of the machine illustrated in the preceding figures;

Figure 5 is a sectional view corresponding to Figure 2 and illustrating a modified construction;

Figure 6 is a schematic representation of alternative methods of introducing and withdrawing the seed material; and Figure 7 is a transverse section on the line 7—7 of Figure 3.

In order to promote an understanding of the invention, a preferred embodiment thereof is illustrated in the drawings, and specific language is employed to describe the same. It will nevertheless be appreciated that no limitation of the scope of the invention is thereby intended, various alternations and modifications thereof being contemplated such as would occur to those skilled in the art to which the invention relates.

Referring now to the embodiment illustrated in Figures 1 to 4 inclusive, it will be observed that the machine comprises a generally cylindrical casing 10 mounted on a base 11, a rotary brush shaft 12 extending longitudinally within and through the casing 10 and being journaled in bearings 15 carried on the end plates 16 of the casing 10. While the casing 10 is referred to for convenience as generally cylindrical, it need not be circular in transverse section, and is preferably constituted by a plurality of arcuate segments 20 to 23 inclusive, differing in degree of curvature, the several segments being bolted together as shown in Figure 2. Thus segments 20, 21 and 22 may be formed with radii larger than the greatest radius of the rotating brush, shaft 12 being positioned eccentrically with respect to these three segments, for instance as shown in Figure 2. Segment 23 may be formed on a radius which is somewhat greater than the radii of segments 20 to 22 inclusive, the segments being of a length and configuration such that a longitudinally extending, upwardly directed gap 32 is provided between segments 20 and 23 through which dislodged lint fibers may be continuously discharged as hereinafter described more fully. For convenience in assembly, each of the segments 20 to 23 inclusive may have an axial length which is only a fraction of the total length of the casing, the casing being constituted by a plurality of annular sections, each comprising four segments, the annular sections being bolted together at their peripheral flanges, four such annular sections being shown in the drawing. To simplify the description, however, segments similarly located in the several annular sections are dealt with as a unitary structure.

The rotating brush may comprise a plurality of spiders, each having a hub portion 25, a plurality of spokes 26, and a rim or peripheral portion 27. The bristles 28 are secured in any convenient manner to the rims 27 of the spiders and project outwardly therefrom. The spiders are assembled on shaft 12 as shown in Figure 3, the hub portions 25 of the end spiders being shortened to afford clearance for nuts 29 which are threaded on shaft 12, so that the spiders are clamped in assembled relation on the shaft. The spiders may be locked for rotation with the shaft 12 by a key 30.

The bristles of the rotating brush may be of any sufficiently durable and flexible bristle material, such as steel wire, brass wire, or the like, preferably of a springy nature. Wires having diameters ranging from about $8/1000$ to $40/1000$ inch are suitable for the purpose, with preferred diameters being about $12/1000$ to $20/1000$ inch, and bristle lengths of about one inch to about three inches or more may be advantageously used. Bristle concentration is also an important factor, since the rate of lint removal is closely correlated with the number of bristle points per inch. I have found that a concentration of about 100 to about 1000 bristles per inch gives satisfactory operation.

The interior of the casing 10 is lined over a substantial portion of its area, and especially that portion of its area adjacent to and on either side of the zone of least clearance between the brush and the casing, with a yieldable lining 35 of relatively high surface friction, as hereinbefore mentioned. In the form of the invention shown in Figures 1 to 4 inclusive, the lining 35 is constituted by rubber or equivalent friction material, and extends over the entire inner surface of the segments 20, 21 and 22 of the casing. The lining may be formed of widely varying material, such as various types of natural and synthetic rubber, used alone or in combination with other materials, canvas belting, carding cloth, wire brushes, or Tampico fiber (a product obtained by removing the pulp from the leaves of one of the Agaves) in the form of brushes with the bristles set perpendicular to the inner wall of the casing. If a partial lining is used, it is necessary, for proper delinting action, that those portions of the casing be lined which are adjacent to the heretofore mentioned zone of least clearance.

The optimum clearance between the bristle tips and the interior surface of the casing lining 35 at the point of closest proximity will vary depending upon the characteristics of the batch of seed being processed, the character of the casing lining, and the degree of delinting that is desired. This clearance is normally in the range from one-half to one and one-half times the minor diameter of a seed, which usually averages about one-fourth inch. In general, the maximum delinting is obtained with a clearance of about one-half the minor diameter of the seed. However, since the power requirement is greater, and the brush and liner wear increases, as the clearance decreases, the normal operating minimum is slightly less than the minor diameter of the seed. In the structure shown in Figure 2, the zone of least clearance between the brush and the casing is located intermediate the ends of segment 21, but this zone may be shifted circumferentially, and the clearance varied, by adjusting the position of shaft 12 within casing 10.

For this purpose I may employ any convenient means for altering the position of the shaft bearings 15, but I prefer to mount the bearings on devices by means of which the amount of air entering casing 10 may be regulated. Thus as shown more particularly in Figures 3 and 4, each of the bearings 15 may be carried on a bearing plate 36 which is slidably received in guides 37 secured to a plate 38. Bolts 39, extending through openings in plate 38 and through elongated slots in bearing plate 36, serve to secure the bearing plate and the bearings 15 in position following appropriate adjustment thereof in the direction of the guides 37. Each plate 38 is so secured to the adjacent end plate 16 of the casing 10 as to be rotatably adjustable thereon. Thus bolts 42, threaded in bosses 43 in the end plate 16, extend through slots 45 in plate 38, an annular collar 47, interposed between end plate 16 and plate 38, serving as a spacer for the latter. It will be observed that when bolts 42 are tightened, plate 38 is retained in any position to which it may be rotatably adjusted. Since the bearings 15 can, in this manner, be adjusted both radially and circumferentially of the casing 10, the minimum clearance between the brush and the casing, as well as the circumferential position of the zone of minimum clearance, may be varied as desired. Optimum operating efficiency and accurate compensation for wear of bristles and casing lining can be readily achieved by this arrangement.

Collar 47 is provided with a plurality of openings 52 cooperating with openings 54 in a second collar 53 which surrounds collar 47 and which may be rotated thereon to vary the extent of registry of openings 52 and 54. It will be appreciated that this affords a convenient means of regulating the volume of air admitted to the casing 10, the air flowing through the registering openings into the interior of the brush structure at each end of the casing, and thence outwardly through the rims 27 of the brush structure. To permit passage of air through the rims, the latter may be suitably apertured or, alternatively, the brushes may be so mounted in the rims as to permit passage of air outwardly through the bristles, such an arrangement tending to keep the bristles clean and free from dust and fiber.

While the major portion of the air admitted to casing 10 enters through the structures just described, the supply of air may be augmented by the provision of one or more further openings in the casing, which may be arranged to by-pass the brush cylinder; the flow of air through such auxiliary openings may also be controlled in any convenient manner. A regulated quantity of air may be admitted, for instance, through the inlet and discharge openings for the seed material, hereinafter described.

The stream of air by which the lint fibers are removed from the casing 10 is preferably induced by exhaust fans or the like, not shown, which are placed in communication with the opening through which the lint fibers are continuously discharged from the casing. Preferably this opening, as hereinbefore explained, extends substantially the entire length of the casing and is unobstructed, although means are provided to regulate the flow of air and entrained lint fibers out of the casing. Thus a hood or duct 55, connected at its outer end with suitable lint collecting means including an exhaust blower or the like is mounted on casing 10, in open communication with the gap 32 defined by the adjacent ends of segments 20 and 23, as illustrated in Figure 2 of the drawing, the air and entrained lint fibers being preferably discharged upwardly into the hood 55. The gap 32 between segments 20 and 23 may be partially bridged by a plate 58 and a plate 60 which extend the full length of the discharge opening, plate 60 being formed to a provide a downwardly directed curved portion 61, and being supported on the casing structure for displacement toward and away from the brush to vary the width of the discharge opening. Any convenient means, such as threaded elements 63 located at a plurality of points spaced lengthwise of the casing, may be provided for displacing plate 60 laterally of the casing. The provision of means whereby the lint discharge opening may be adjusted is highly important, as hereinafter explained.

Any known means suitable for collection of the lint may be used. For example, I may discharge the air and entrained lint into a cyclone separator, bag filters or a suction reel, i. e., a screen surfaced or perforated cylinder to the interior of which a vacuum can be applied so that the free lint may be drawn against the outer surface of the cylinder and held there, by the effects of the vacuum, until removed by some mechanical means. The last mentioned type of collecting apparatus is commonly referred to as a lint condenser and is only one of the many types of lint collectors known in the art.

The seed material may be introduced into casing 10 by either a gravity type of feed mechanism or by feed mechanism of the force feed type. In the preferred form of the invention, as shown more particularly in Figure 2, I employ a force feed mechanism having the inlet located in the lower portion of the casing, and comprising a rotatable feed screw 65 working in a barrel 66 which enters the casing tangentially at a point on the periphery of the latter where substatnial clearance between the brush and the casing interior occurs. The screw 65 is supplied with seed from a hopper 68, the rate of supply being controlled by a rotating feed roll 69 extending across the lower portion of the hopper 68, the hopper discharging directly into the barrel 66. A drive pulley 70 is secured on the shaft of feed screw 65, and the feed roll 69 is driven from a variable radius pulley 71, also secured to the shaft, and through suitable variable speed gearing 73, whereby the rate of delivery of the seed to the screw 65 may be regulated. The details of the variable speed gearing 73 form no part of the instant invention. In the preferred form of the invention, the seed is supplied at one point only, located centrally of the casing 10, but a plurality of supply points may be used as hereinafter described.

Two outlets for delinted seed are provided in the machine illustrated herein, one being located at each end of casing 10. Again, the number and location of the seed outlets may be varied as hereinafter described. Each outlet may comprise a spout 75 discharging downwardly and communicating with an opening 76 in an end plate 16 of the casing 10 adjacent the generally cylindrical casing periphery. While means may be provided, if desired, to promote the movement of seed material from the seed inlet to the seed outlet or outlets, for instance by the provision of spiral ribs or the like on the casing lining 35, I have found that in practice the flow of seed from inlet to outlet proceeds smoothly without such special precautions, even though the casing is horizontal.

In Figure 6 is illustrated schematically several alternate methods of feeding seed material through the machine. Thus in the arrangement suggested at A, seed enters at one end of the casing 10 and is discharged at its opposite end. At B is represented the feeding arrangement illustrated in Figures 1 to 4 inclusive, seed being introduced at the central part of the casing and progressing toward each end, where outlets are provided. In the arrangement shown at C, seed is introduced in the casing 10 through two inlets, located respectively at one end and adjacent the central portion of the casing, and the delinted seed is removed through two outlets, one adjacent the central portion of the casing and the other at its opposite end. With this arrangement, it may be desirable to provide a baffle on the casing wall intermediate the centrally located inlet and outlet to ensure the flow of seed material from the centrally located inlet toward the outlet at the end of the casing. At D is illustrated an arrangement in which seed is introduced at both ends of the casing and is discharged from the central portion. These and other variations are contemplated as part of the instant invention.

In the operation of the embodiment illustrated in Figures 1 to 4 of the drawing, the brush assembly of the delinter rotates in a clockwise direction as shown in Figure 2 and induces a circulating air current within the casing 10, rotating in the same direction. Linty cottonseed is fed into the screw 65 and enters the delinter casing tangentially. Very little force is required to convey the seed material into the casing; as soon as it enters the casing, it is picked up by the aforementioned rotating air stream and is forced against the resilient friction-exerting lining 35 of the casing 10 by the combined action of the air stream and the delining brush. The movement of the seed keeps it in a more or less fluid state permitting the seed material entering the delinter to displace longitudinally of the casing 10 that previously admitted.

Within the casing 10, the seed progresses in a generally spiral path, around the path of the bristle tips, from the indicated linty seed inlet toward a delinted seed outlet through coaction of the rotating brush and the rotating air stream. As the seed works its way toward the outlet it is repeatedly brought into contact with the resilient casing lining 35 and the delinting brush, thus affording ample opportunity for the seed to be fully delinted.

The stream of seed and foreign material is repeatedly thrown, by the combined effects of the rotating air stream and the centrifugal force imparted by the rotation of the delinting brush, from a point on the upper portion of periphery of the casing lining 35 tangentially across the lint discharge opening 32. The plate 58 provides a smooth nonrestraining surface, so that the stream of lint, trash and seed, after passing through the area wherein the delinter brush and casing 10 are in closest proximity, may be directed smoothly into the desired path. The smoothness of this plate 58 with its inherent nonrestraining property also reduces the tendency of the seed to bounce between the rotating brush and the casing wall and thus further helps to prevent seed and foreign particles from entering the lint hood.

While passing across the opening 32, a portion of the stream of rotating air, which is acting as a carrier for the seed, lint, and foreign material, is diverted from its path because of the decreased air pressure, established by the exhaust fans, on the lint hood side of the opening. The velocity of the air thus diverted through the lint discharge opening determines the rate of change in direction of the material moving across the opening. Thus, at a low velocity, only the very light particles of material will have a great enough rate of change in direction while passing across the opening to be diverted sufficiently to pass therethrough and into the lint hood. It then follows that the greater the velocity of this air stream, the heavier will be the diverted particles passing into the lint hood, so that through the medium of this air stream, an exceedingly good separation of lint from the seeds and trash is obtained. The velocity of the stream of air may be controlled by increasing or decreasing the speed of the exhaust fans, or by enlarging or constricting the openings through which air enters the interior of the delinting brush. Thus, this air stream velocity can be adjusted so that only the lint, present substantially as individual fibers, is diverted from its path sufficiently to enable it to pass out of the delinter casing and into the lint hood, while the seed, trash, and light particles of hull pass on across the lint discharge opening and continue to rotate within the casing 10 until discharged with the delinted seed. The method of separation of lint from seed and trash hereinbefore described makes possible the production of clean lint from very trashy seed.

The stream of seed is thrown across the lint discharge opening with a velocity sufficient to cause the individual seeds to break upon impact against an unyielding surface if any attempt is made to suddenly change the direction in which they are traveling. Since such seed breakage is deterimental to the production of good lint and is therefore undesirable, the curved portion 61 of plate 60 is preferably so positioned that its leading edge is substantially tangential to the stream of seed, whereby a sudden change in direction of the seed is avoided, minimizing the breakage of seed. Thus, the stream of seed passes across the lint discharge opening, flows smoothly around the arc defined by the curved portion 61 of plate 60 and the casing segment 23, and is again brought into contact with the delinting brush.

The adjustment of plate 60 may also be used to control the separation of particles of seed and trash from lint. As hereinbefore described, the velocity of the air through the lint discharge opening determines the rate of change in direction of the particles of material passing across this opening. Therefore, since the heavier particles have a slower rate of change of direction, it may be seen that the greater the length of time the stream of particles is in contact with the air stream the greater the number of particles that will be diverted sufficiently to pass into the lint hood. Thus, assuming that the stream of seed, trash and lint moves at a fairly constant velocity, the length of time the said stream is in contact with the discharging air current is determined by the width of the lint discharge opening. Therefore, increasing or decreasing the width of this opening, by adjusting plate 60 toward or away from the brush, will correspondingly increase or decrease the time of contact with the air current and consequently determine the number and weight of particles diverted into the lint hood.

Delinting may be adversely affected by such factors as too little or too great fan capacity in the lint collecting system, and the quality and lint content of the cottonseed as received. Compensation for these variables may be achieved by adjustment of plate 60 to control the amount of air which is allowed to discharge from casing 10, or by adjusting the degree of registry of the openings in the collars 47 and 53, or by a combination of the two methods.

It is a major feature of my invention that the lint has not, at the point of discharge into the hood 55, begun to mat together and trap foreign material. This permits the air stream to move the lint, present substantially as individual fibers of small mass, out of the casing 10 and into the hood free of the heavier foreign particles as soon as separation occurs, permitting the production of clean lint from very trashy seed.

In the form of the invention illustrated in Figure 5, certain elements are identified by the reference numerals employed to designate the corresponding elements of Figures 1-4 inclusive, and further description of such elements is omitted here. It will be appreciated that the only essential change involved in Figure 5 is the substitution, for the friction lining illustrated and described hereinbefore, of bristles generally similar to those employed on the rotating brush. These bristles, represented at 80, may be provided only on the inner surface of segment 21 of the casing, although a larger area of the casing may be lined if desired. The segment 21 is, of course, described on an arc which is considerably greater than, although concentric with, that of the adjacent segments 20 and 22, to afford the necessary additional space for accommodation of the bristles 80. The segment 21 may be mounted on or secured to end plate 82, terminal flanges 83 being provided for connection with abutting flanges on the adjacent segments.

In this embodiment of the invention, the diameter of the individual wire bristles making up the lining is from about $4/1000$ to about $24/1000$ inch, with from about $12/1000$ to $14/1000$ inch being the preferred range. A quantity of these individual bristles, desirably of a springy nature, are preferably assembled to form long, narrow brushes which are mounted on the inner wall of the casing and are longitudinally co-extensive with the casing. The brushes are so mounted that the individual bristles are directed inwardly, being substantially perpendicular to the casing wall, the tips forming the effective inner lining surface. This type of lining supplements the delinting action of the rotating bristles since a portion of the delinting is actually accomplished by the wire bristles of the liner, i. e., individual lint fibers are dislodged from the seed when they collide with the bristle tips of the lining.

The mounted wire brushes which make up the lining are spaced to give a bristle concentration of from about 600 to about 4000 per square inch depending upon the amount of delinting required and the wire size used. In a liner having a bristle concentration falling within this range, the individual bristles mutually support each other when deflected by the impact of the seed during processing, provided that the sum of the cross-sectional areas of the individual bristles is at least above 5 per cent and normally not over 50 per cent of the total area so lined, thus virtually eliminating bristle deformation and breakage.

The brush shaft is connected by any suitable means with a prime mover adapted to rotate the shaft at high speed. A peripheral speed of about 1500 to about 3500 feet per minute has been found to be quite effective although by no means limiting. For modifications of this delinter employing different bristle spacings, different brush diameters, or different clearances between the peripheral wall of the casing 10 and the brush, speeds somewhat above or below this range may be found to be desirable.

For example, with a 20-inch diameter brush I have obtained satisfactory operation with shaft speeds varying from about 275 to 700 R. P. M. With a machine having a larger brush diameter one would normally employ a lower speed and I have found that with a 36-inch brush, shaft speeds from 150 to 378 R. P. M. give satisfactory results, although the particular speeds mentioned are not to be construed as the minimum or maximum for satisfactory operation. For corresponding performance, approximately the same range of peripheral brush speeds is employed.

A considerable economic advantage may be realized by the use of the delinter of my invention, since the power requirements of a delinter of this type (with a 20-inch diameter brush) are only about one-half that of the most efficient delinter of comparable size heretofore available.

The intensity of the delinting action is controlled by adjustment of the clearance between the brush and the casing 10 while the duration of the delinting action is controlled by the rate at which seed is fed into the delinter. In addition, the duration of the delinting action may be influenced by several other factors, such as the rotating speed of the brush, characteristics and spacing of the brush bristles and the nature of the lining surface. In this last named connection, it is noteworthy that the frictional characteristics of the suggested lining materials are such as to eliminate tendency of seed to move too rapidly within the actual delinting zone.

It is to be understood that the described delinter is only exemplary, is in no way limiting and that other arrangements and features old in the art of delinting cottonseed by brush action, or obvious to those skilled in the field of the invention, may advantageously be employed in conjunction with the improvements herein described and claimed.

Having thus described the invention, what is claimed as new and desired to be secured by Letters Patent is:

1. A cottonseed delinting machine comprising a generally cylindrical, substantially horizontal casing, said casing having an interior lining of a yieldable friction-exerting material and having at least one linty seed inlet and at least one delinted seed outlet spaced longitudinally from the inlet, said casing being formed to provide an unobstructed lint discharge opening extending substantially the full length of the casing, a cylindrical brush, having outwardly projecting bristles, said brush being dimensioned to provide an annular space between the bristle tips and the casing over the total circumference of the brush, bearing means journaling said brush for rotation within said casing on an axis extending lengthwise of said casing and eccentric with respect thereto, the annular space between said brush and said casing being of non-uniform width, and approximating, in the zone of least width, from about one-half to one and one-half times the minor diameter of the seed, means for rapidly rotating said brush, and means for causing a stream of air to flow into said casing and leave through said lint discharge opening, whereby the substantially individual fibers of lint dislodged from the seed are entrained in said air stream and discharged from the delinter through said opening.

2. A cottonseed delinting machine comprising a generally cylindrical, substantially horizontal casing, said casing having an interior lining of a yieldable friction-exerting material and having at least one linty seed inlet and at least one delinted seed outlet spaced longitudinally from the inlet, said casing being formed to provide an unobstructed lint discharge opening extending substantially the full length of the casing, a cylindrical brush having outwardly projecting bristles, said brush being dimensioned to provide an annular space between the bristle tips and the casing over the total circumference of the brush, bearing means journaling said brush for rotation within said casing on an axis extending lengthwise of said casing, the annular space between said brush and said casing being of non-uniform width, and approximating, in the zone of least width, from about one-half to one and one-half times the minor diameter of the seed, means mounting said bearing means on said casing for adjustment laterally of said casing toward and away from the said zone of least width, whereby the width of said zone may be altered, means for rapidly rotating said brush, and means for causing a stream of air to flow into said casing and leave through said lint discharge opening, whereby the substantially individual fibers of lint dislodged from the seed are entrained in said air stream and discharged from the delinter through said opening.

3. A cottonseed delinting machine comprising a generally cylindrical, substantially horizontal casing, said casing having an interior lining of a yieldable friction-exerting material and having at least one linty seed inlet and at least one delinted seed outlet spaced longitudinally from the inlet, said casing being formed to provide an unobstructed lint discharge opening extending substantially the full length of the casing, a cylindrical brush, having outwardly projecting bristles, said brush being dimensioned to provide an annular space between the bristle tips and the casing over the total circumference of the brush, bearing means journaling said brush for rotation within said casing on an axis extending lengthwise of said casing and eccentric with respect thereto, the annular space between said brush and said casing being of nonuniform width, and ranging from a zone of least width, approximating from about one-half to one and one-half times the minor diameter of the seed, to a zone remote from said zone of least width having a width many times that of said zone of least width, said lint discharge opening being located adjacent said last named zone, means for rapidly rotating said brush, and means for causing a stream of air to flow into said casing and leave through said lint discharge opening, whereby the substantially individual fibers of lint dislodged from the seed are entrained in said air stream and discharged from the delinter through said opening.

4. A cottonseed delinting machine comprising a generally cylindrical, substantially horizontal casing, said casing having an interior lining of a yieldable friction-exerting material and having at least one linty seed inlet and at least one delinted seed outlet spaced longitudinally from the inlet, said casing being formed to provide an unobstructed lint discharge opening extending substantially the full length of the casing, a cylindrical brush, having outwardly projecting bristles, said brush being dimensioned to provide an annular space between the bristle tips and the casing over the total circumference of the brush, bearing means journaling said brush for rotation within said casing on an axis extending lengthwise of said casing and eccentric with respect thereto, the annular space between said brush and said casing being of non-uniform width, and approximating, in the zone of least width, from about one-half to one and one-half times the minor diameter of the seed, means for rapidly rotating said brush, and means for causing a stream of air to flow into said casing and leave through said lint discharge opening, whereby the substantially individual fibers of lint dislodged from the seed are entrained in said air stream and discharged from the delinter through said opening, and means adjustably mounted on said casing to vary the circumferential dimension of said lint discharge opening to regulate the discharge therethrough of air entrained material.

5. A cottonseed delinting machine comprising a generally cylindrical, substantially horizontal casing, said casing having an interior lining of a yieldable friction-exerting material and having at least one linty seed inlet and at least one delinted seed outlet spaced longitudinally from the inlet, said casing being formed to provide an unobstructed lint discharge opening extending substantially the full length of the casing, a cylindrical brush having an air pervious rim, outwardly projecting bristles mounted on said rim, said brush being dimensioned to provide an annular space between the bristle tips and the casing over the total circumference of the brush, bearing means journaling said brush for rotation within said casing on an axis extending lengthwise of said casing and eccentric with respect thereto, the annular space between said brush and said casing being of non-uniform width, and approximating, in the zone of least width, from about one-half to one and one-half times the minor diameter of the seed, means for rapidly rotating said brush, adjustable air inlet openings at each end of said casing, said air inlet openings communicating with the interior of said brush, and means for causing a stream of air to flow into said casing through said air inlet openings, through the air pervious brush rim, and out of said casing through said lint discharge opening, whereby the substantially individual fibers of lint dislodged from the seed are entrained in said air stream and discharged from the delinter through said opening.

6. The delinting machine of claim 3 wherein the casing lining is rubber.

7. The delinting machine of claim 3 wherein the casing lining is of the brush type, having from about 600 to about 4000 bristles per square inch set substantially perpendicularly to the casing wall.

8. The delinting machine of claim 7 wherein the bristles are of wire from about four one-thousandths (0.004) to about twenty-four one-thousandths (0.024) inch in diameter and about one to three inches long.

9. The delinting machine of claim 3 having a single linty seed inlet adjacent the longitudinal center and a delinted seed outlet at each end of the casing.

10. The delinting machine of claim 3 wherein the delinting brush is made from wire bristles from about eight one-thousandths (0.008) to about forty one-thousandths (0.040) inch in diameter and about one to three inches long.

11. The delinting machine of claim 3 wherein the means for rotating said brush imparts to the latter a peripheral speed of at least 1500 feet per minute.

12. A cottonseed delinting machine comprising a substantially horizontal generally cylindrical casing, said casing having at least a partial lining of a deformable elastic material, at least one linty seed inlet and at least one delinted seed outlet, and an upwardly directed lint discharge opening extending over substantially the full length of the casing at a greater elevation than the vertical midpoint of the casing, a cylindrical brush supported for rotation within and on an axis extending lengthwise of said casing, said casing being eccentrically related to said axis, whereby zones of least and of maximum clearance are provided between the brush and the casing, said lint discharge opening being located adjacent said zone of maximum clearance, the said clearance between the brush and the casing lining being at least one-half the minor diameter of the seed and sufficient to allow said brush to sweep the seed around the interior of the casing, into frictional engagement with the casing lining in said zone of least clearance, and to throw the seed tangentially across the lint discharge opening, that portion of the casing wall toward which the seed is thrown being unlined and being substantially tangential to the path of the seed impinging thereon, means for rotating said brush at a high peripheral speed, and means for causing a stream of air to enter the casing and leave through said lint discharge opening, whereby the lint fibers dislodged from the seed, present substantially as individual fibers, are removed from the delinter.

13. A seed cleaning machine comprising a generally cylindrical, substantially horizontal casing, said casing having an interior lining of a yieldable friction-exerting material and having at least one seed inlet and one seed outlet spaced longitudinally from the inlet, said casing being formed to provide an unobstructed discharge opening extending substantially the full length of the casing, a cylindrical brush, having outwardly projecting bristles, said brush being dimensioned to provide an annular space between the bristle tips and the casing over the total circumference of the brush, bearing means journaling said brush for rotation within said casing on an axis extending lengthwise of said casing and eccentric with respect thereto, the annular spacing between said brush and said casing being of non-uniform width, and approximating, in the zone of least width, from about ½ to 1½ times the minor diameter of the seed, means for rapidly rotating said brush, and means for causing a stream of air to flow into said casing and leave through said discharge opening.

14. The method of delinting cottonseed which comprises causing the seed to travel through a succession of circuitous paths, in a substantially spiral course, within the boundaries of a cylindrical annular treatment zone of nonuniform width, comprising a portion of least width encompassing not more than one-fourth of the circumference of each of the said circuitous paths and a portion of greater width, subjecting the linty seed, while traveling said circuitous paths, to rapidly repeated yielding impact applied tangentially of the path of movement of said seed and circumferentially of the said annular treatment zone and concurrently yieldably opposing movement of the seed along or radially outward of said circuitous paths, whereby the individual lint fibers are dislodged from the seed coat, causing air to flow into said zone and to move along said paths, said movement of air aiding the action of the rapidly repeated yielding impact in propelling the seed along said circuitous paths and inducing and maintaining within the portion of said zone of greater width a spatial separation of the dislodged lint fibers and seed and minimizing matting of the said fibers with each other and with seed, causing a stream of air to move from said annular treatment zone outwardly from the periphery of each of said circuitous paths, moving the seed and dislodged lint fibers across the said outwardly moving stream of air, the velocity of said outwardly moving stream of air being sufficient to deflect only the dislodged lint, here present substantially as individual fibers, from the circuitous path and to cause it to follow the path of the outwardly moving stream of air, the seed being retained within the treatment zone, thereby effectively segregating the lint, in an unmatted condition, from the seed.

References Cited in the file of this patent

UNITED STATES PATENTS

| | | |
|---|---|---|
| 2,095,155 | Sheppard | Oct. 5, 1937 |
| 2,144,579 | Sheppard | Jan. 17, 1939 |
| 2,435,592 | Loewy | Feb. 10, 1948 |
| 2,546,286 | Zakel | Mar. 27, 1951 |
| 2,644,986 | Pazandak | July 14, 1953 |

FOREIGN PATENTS

| | | |
|---|---|---|
| 393,861 | Great Britain | June 15, 1933 |